May 1, 1956  L. T. ELLIOTT ET AL  2,743,897
UNITARY POWER OPERATOR FOR OPENING AND CLOSING VALVES
Filed Nov. 28, 1952  4 Sheets-Sheet 1

Lynn T. Elliott
James N. Morrell
INVENTORS

BY Browning & Simms

ATTORNEYS

May 1, 1956 L. T. ELLIOTT ET AL 2,743,897
UNITARY POWER OPERATOR FOR OPENING AND CLOSING VALVES
Filed Nov. 28, 1952 4 Sheets-Sheet 2
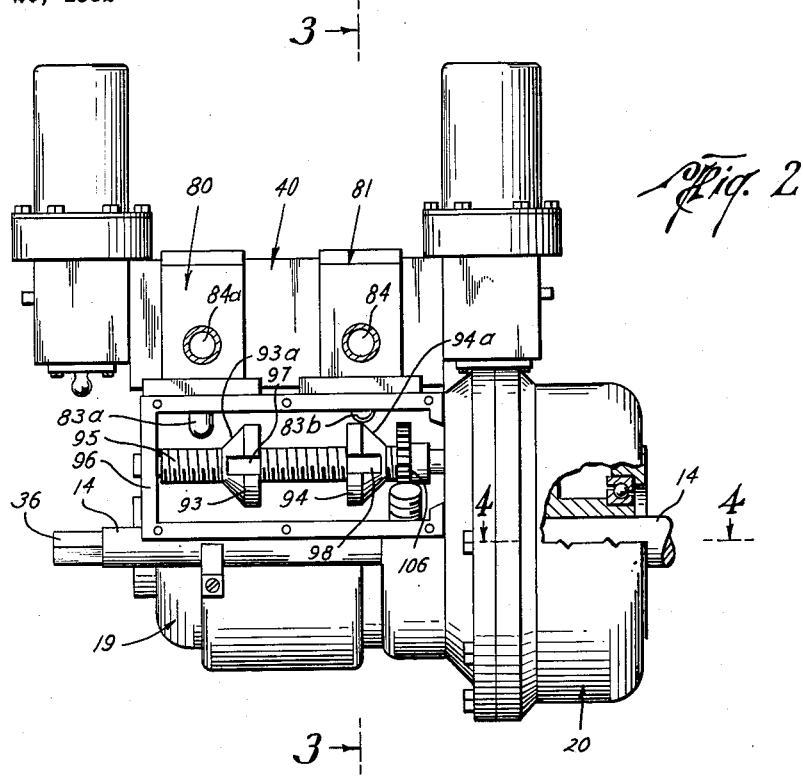
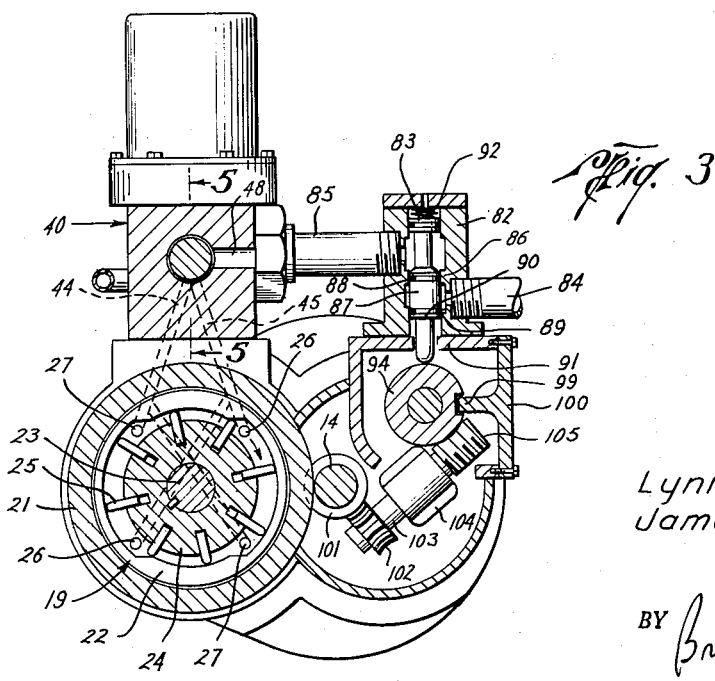
Lynn T. Elliott
James N. Morrell
INVENTORS
BY Browning & Simms
ATTORNEYS May 1, 1956 L. T. ELLIOTT ET AL 2,743,897
UNITARY POWER OPERATOR FOR OPENING AND CLOSING VALVES
Filed Nov. 28, 1952 4 Sheets-Sheet 3

Lynn T. Elliott
James N. Morrell
INVENTORS

BY Browning & Simms

ATTORNEYS

May 1, 1956  L. T. ELLIOTT ET AL  2,743,897
UNITARY POWER OPERATOR FOR OPENING AND CLOSING VALVES
Filed Nov. 28, 1952  4 Sheets-Sheet 4
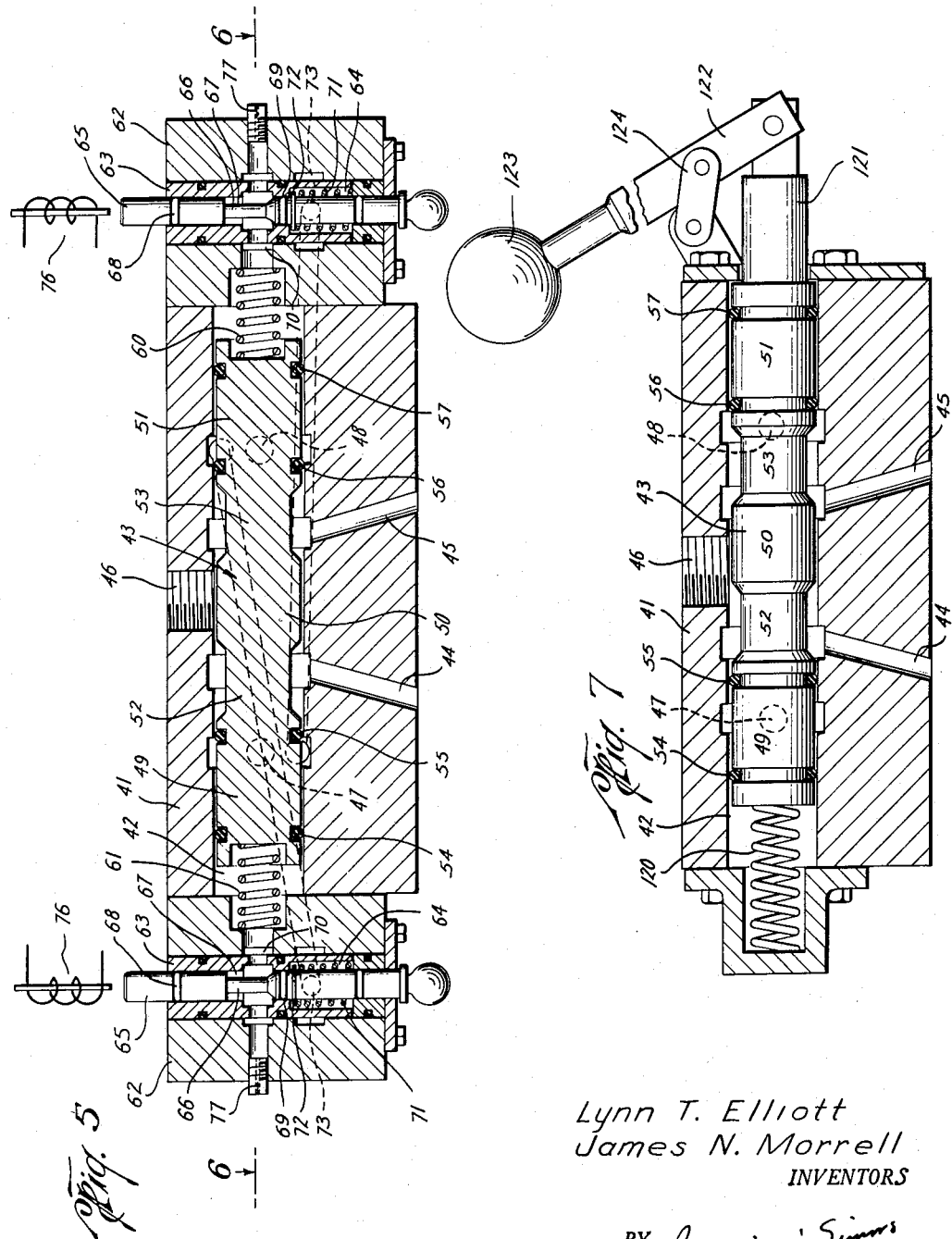
Lynn T. Elliott
James N. Morrell
INVENTORS
BY Browning & Simms
ATTORNEYS United States Patent Office 2,743,897
Patented May 1, 1956

2,743,897

UNITARY POWER OPERATOR FOR OPENING AND CLOSING VALVES

Lynn T. Elliott and James N. Morrell, Houston, Tex.

Application November 28, 1952, Serial No. 322,934

15 Claims. (Cl. 251—59)

This invention relates to a valve operator adapted to open and close a valve. In one of its aspects, it relates to a valve operator particularly adapted to use a gas as an operating fluid.

In the operation of pipe lines and the like, it is conventional to employ control valves which are opened and closed by a valve operator powered by a pressure fluid such as that being transmitted through the pipe line. Such a valve operator is at times desirably controlled from a remote control station so that coordinated opening and closing of a number of such valves, which may be widely spaced apart, can be accomplished from a single point. In other instances, such valve operators are connected to the pipe line in such a fashion that they will be actuated to close the valve whenever an unusual drop in pressure occurs in the pipe line, such as by a break in the line or for other reasons.

In many valve operators in service on high pressure gas pipe lines, the actuating mechanism has been driven by a pneumatic type motor receiving its actuating gas from the pipe line. Such motors do not permit gas flow therethrough without causing the motor to rotate. One disadvantage of such type motor is that any gas leakage from the pipe line to the motor causes the latter to creep until it is mechanically stopped by jamming the pipe line valve to full open or full closed position after which full pipe line pressure builds up against the motor. Consequently, leakage is desirably avoided to prevent impressing unwanted stresses on the valve operator and pipe line valve. When leakage to the motor is thus prevented, the motor and the conduits connecting it to the pipe line are apt to freeze during cold weather.

Another disadvantage arising from using pneumatic motors is that they are not constructed to operate at the high gas pressures common in modern pipe line systems so that it is necessary to provide a pressure reducing means between the pipe line and the motor to reduce the pipe line pressure to a suitable operating level for the motor. When a valve is employed as such pressure reducing means, the throttling of the gas greatly reduces its temperature so that hydrate formation with its resultant clogging is quite common.

Further, valve operators employing gas as a motive fluid have been quite cumbersome in construction and have required considerable piping in order to connect them to the source of motive fluid. Also, many of the valve operators have required extensive modification of the conventional pipe line valve upon which they are to be mounted. This is particularly undesirable where such valve is made by one manufacturer and the operator by another manufacturer. It would therefore be highly desirable to possess a valve operator which is essentially self-contained and requires very little modification of the pipe line valve in order to be mounted thereon and also requires very little piping to assemble it in operating condition on the pipe line valve.

Further, many valve operators employ limit switches which stop their operation when the pipe line valve member has been moved a predetermined open and closed positions. Such a valve member is subject to wear and as such wear progresses, the member must be moved further into its seat in order to provide a satisfactory seal. It would therefore be desirable to have a readily adjustable limiting means for stopping the valve operator, such means being easily accessible and being positively and simply adjustable.

While the above discussion has been devoted largely to pipe lines and pipe line valves, it will be understood that this invention is useful to operate valves other than those in that which is technically known as "pipe line service." Thus, the operator of this invention is broadly useful to operate almost any type of valve found in industrial service.

An object of this invention is to provide a valve operator susceptible of very compact construction and being mountable upon the valve it is to operate with very few piping connections and with a minimum of special construction of the valve to be operated.

Another object of this invention is to provide a valve operator for opening and closing a valve and powered by a gaseous fluid, particularly one at a high pressure, the operator being particularly arranged for mounting as a unit upon a valve without substantial modification of the latter.

Another object of this invention is to provide a valve operator having a motive means comprising a rotary motor actuated by a gaseous fluid and having readily adjustable means responding to rotation of a rotatable part driven by the motor to stop the motor after a desired number of revolutions thereof.

Another object is to provide in such a valve operator a motive means adapted to be actuated by a gaseous fluid from an elevated pressure source without necessitating pressure reduction thereof prior to its use in the motive means.

Another object is to provide in such a valve operator a motor of such construction as to permit limited seepage or leakage of gaseous fluid therethrough without causing the motor to creep and exert unwanted torque on the mechanism interconnecting it with the valve whereby freezing of the motor can be substantially eliminated.

Another object of this invention is to provide a valve operator including a rotary motor, a limit valve arranged to stop flow of fluid through the motor after the latter has turned a predetermined number of revolutions, the limit valve being actuated through cooperating actuating parts by a movable element, such as a cam, driven by a rotating part whereby the operator can readily be constructed as a compact unit ready to mount on the valve it is to operate with a minimum of alteration of such valve.

Another object is to provide in such an operator a means for easily adjusting the movable element or cam relative to the limit valve so that the number of revolutions the motor will turn can be easily varied by a simple adjusting procedure.

Another object of this invention is to provide a valve operator having a rotatable and reversible fluid motor controlled as to its direction of rotation by a selector valve and having the extent to which it can turn controlled by a limit valve actuated by a cam part moved by a rotatable part driven by the motor, the selector valve being controlled by a pilot means adapted to be actuated from a remote station.

Another object of this invention is to provide a valve operator having a means for limiting the amount the valve operator can move a valve element which it drives, such means being driven by a rotatable part forming a part of the operator itself so that a compact operator can be constructed without having any direct linkage between the valve element and the limiting means, the limiting means being readily adjustable so that the amount the valve element is moved can be changed or varied by a very simple adjusting procedure.

Other objects, advantages and features of this invention will be apparent to one skilled in the art upon a consideration of the written specification, the appended claims and the attached drawings wherein:

Fig. 2 is a side view of the valve operator illustrated in Fig. 1;

Fig. 3 is a view taken on the line 3—3 of Fig. 2;

Fig. 5 is a vertical cross-sectional view of the selector valve employed with the operator shown in Fig. 2;

Fig. 7 illustrates another embodiment of the selector valve; and

Like characters of reference are used throughout the several views to designate like parts.

Figure 1:
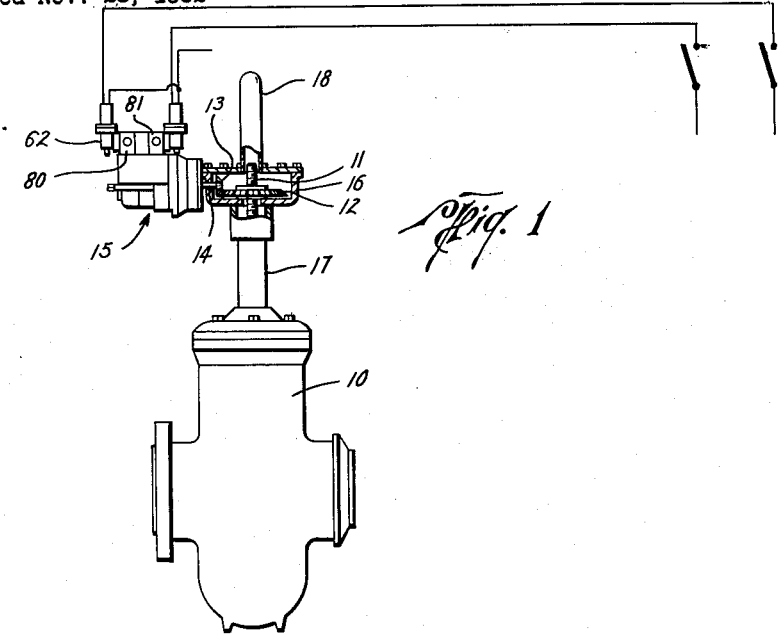
Fig. 1 is an elevational view, partially in cross-section, showing one embodiment of the valve operator of this invention mounted upon a valve.

Referring to Fig. 1, there is shown a valve 10, hereinafter referred to as the "main" or "operated" valve, having a stem 11 which is threaded to a gear 12, the latter, upon rotation, opening and closing the valve. While the operator of this invention is illustrated in Fig. 1 as being mounted upon a valve of the rising stem type, it is to be understood that it can be employed with valves of other types, such as non-rising stem valves, plug valves, and the like.

Cooperating with gear 12 is a drive gear 13 carried by an output shaft 14. This output shaft is driven by the valve operator as will be made apparent below and is usually supplied as a part of the valve upon which the operator is to be mounted. The valve operator, designated generally by the numeral 15, is mounted upon a housing 16 which surrounds gears 12 and 13 and is supported upon the valve bonnet 17. An extension 18 of housing 16 provides a cover for stem 11 and permits the latter to raise as it opens the valve.

Referring now to Figs. 2 and 3, it will be seen that the valve operator comprises generally a motor 19, a force transmitting means 20, such as a speed reducing mechanism, and controls for stopping and starting and also determining the direction of rotation of motor 19.

Referring to Fig. 3 in particular, it will be seen that the preferred motor of this invention comprises a housing 21 in which is mounted a cam ring 22. Rotatable drive shaft 23 of the motor is journaled in the housing and has a rotor 24 keyed thereto. Rotor 24 bears a plurality of vanes 25 in radial slots around its periphery and these vanes are urged outwardly from their respective slots so that their outer ends bear against cam ring 22. When rotor 24 is rotating in the direction of the arrow shown in Fig. 3, gas is admitted through ports 26 into the space between the vanes as each vane rotates past the ports and as it emerges into the long radius portion of the cam ring. With this direction of rotation, ports 27 serve as discharge ports and gas discharges from the space between adjacent vanes as each vane approaches the short radius portion of the cam ring. In this manner, gas is admitted between the vanes to turn rotor 24 and shaft 23 and to be discharged from the motor when the effective pressure head of such gas has been consumed.

On the other hand, when the motor is to be rotated in a direction opposite to the arrow shown in Fig. 3, ports 27 become the gas inlet ports and ports 26 the gas discharge ports. With this direction of rotation, the action of the gas is as described above except for the reversal of ports.

Thus it will be seen that there is provided a motor of the rotary type, preferably of the vane type, which is adapted to drive bevel gear 13 through speed reducing means 20.

The motor is of the reversible type and is preferably of the same general construction as is shown and described in U. S. Patent 2,393,223, reference to which is made for a more complete disclosure, if desired. With a motor of this type, the working parts thereof, such as vanes 25, rotor 24 and cam ring 22, will have a sufficiently loose fit with each other that gas seepage through the motor will be permitted. This seepage prevents any leakage through the control system for the motor from building up a relatively elevated pressure in the motor housing. Also, preventing such a build up of pressure substantially eliminates any tendency for the motor to turn and impress unwanted torque on the speed reducing mechanism 20 and the bevel gears employed to drive the stem of the valve. Further, leakage is advantageous during cold weather because it prevents freezing of the motor and control apparatus since the constant seepage of gas will keep the motor and attendant parts sufficiently warm that ice or hydrates will not likely form therein.

As stated above, the motor is connected to a force transmitting means which is illustrated herein as a speed reducing mechanism 20. Such speed reducing mechanism comprises a frame or housing 30 which rotatably supports driven gear 31 by means of bearings 32 and 33. Meshing with gear 31 is a driving gear 34 having one of its ends supported in the housing 30 by a bearing 35. The other end of the gear is formed to receive shaft 23 of the motor so that power can be transmitted to the motor through gears 34 and 31 to shaft 14. It will be noted that shaft 14 can pass entirely through housing 30 and is keyed to gear 31. This permits mounting of the valve operator on the main valve by merely sliding it over shaft 14 and bolting it to the main valve housing.

As illustrated in Fig. 2, shaft 14 extends to have a free end beyond the valve operator and this end is formed with a wrench-hold 36 so that a handwheel, wrench, or other means can be mounted thereon to manually open and close the valve.

In accordance with one aspect of this invention, there is provided a selector valve, designated generally by the numeral 40 in Figs. 2 and 3, adapted to control not only the flow of fluid through the motor but also its direction of flow.

Figure 6:
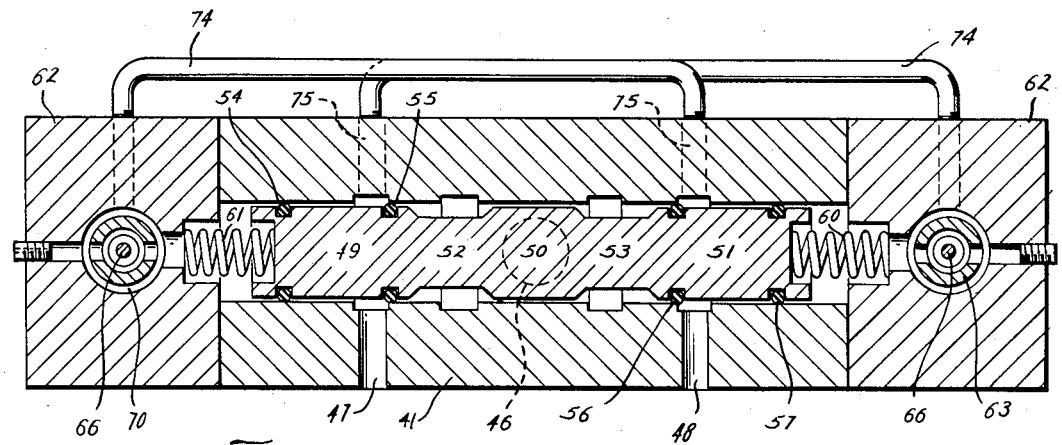
Fig. 6 is a view taken on the line 6—6 of Fig. 5.

Referring to Figs. 5 and 6 for the details of the selector valve, it will be seen that it comprises a housing 41 having a bore 42 therethrough in which is slidably received a valve member or element 43. The housing is provided with ports 44 and 45 which connect, respectively, with ports 27 and ports 26 of the motor via interconnecting passages in the motor housing. It will be understood that, in accordance with the preferred construction of the motor, ports 26 are on one side of rotor 24 and ports 27 are on the other side although they are shown on the same side in Fig. 3 to simplify the drawing. It is for this reason that the ports 44 and 45 are shown in Fig. 5 to diverge outwardly since each port connects with a passage to either side of rotor 24. Housing 41 is also provided with an exhaust port 46 through which fluid from the motor exhausts as will be explained below. Inlets 47 and 48 are also provided in housing 41 for the introduction of a pressure fluid or gas from an external source.

Referring now to valve member or element 43, it will be seen to include three large diameter portions 49, 50 and 51 each having a sliding fit with bore 42. Spaced intermediate these large diameter portions are reduced diameter portions 52 and 53 providing annuli between the valve member and the walls of bore 42 to act as gas conducting passages between the various ports. The valve member can be provided with sliding seals, such as O-rings 54, 55, 56 and 57, so that large diameter portions 49 and 51 can be moved back and forth within bore 42 to act as valve elements to open and close inlets 47 and 48 to ports 44 and 45, respectively. Thus, with the valve member in a neutral position as shown in Fig. 5, O-rings 54 and 55 form a seal with the walls of bore 42 on either side of inlet 47 and prevent the flow of gas into port 44. However, when valve member 43 is moved to the left in Fig. 5, O-ring 55 moves past inlet 47 and permits gas to flow from the inlet through the annular space provided around reduced diameter portion 52 and thence into port 44. When in this left-hand position, O-ring 56 maintains its seal on the downstream side of port 48 to prevent flow therefrom to port 45. On the other hand, when the valve member 43 is moved to the right, inlet 48 will be uncovered to permit flow into port 45 while port 47 remains sealed by O-ring 55.

It will be noted that when valve member 43 is moved to the left, for example, communication is established between port 45 and outlet port 46 to provide for exhaust of gas from the motor. On the other hand, when the valve member is moved to the right, port 44 is connected with port 46.

With this construction, it will be seen that the selector valve element or member 43 is movable to a first position to establish flow from one of inlets 47 and 48 through one of ports 44 and 45 to the motor while the other inlet is blocked. After the fluid has passed through the motor and expended its power therein, it will be exhausted to outlet 46 through the port not connected to an inlet. This causes the motor to rotate in one direction. The valve element is likewise movable to a second position to reverse the direction of flow to the motor and hence the latter's rotational sense. Thus the selector valve illustrated in Fig. 5 can be determinative not only of the direction of rotation of the motor but also as to when the motor starts to rotate.

It will be noted that large diameter portion 50 is not provided with any sliding seals so that if there is any leakage past O-rings 55 and 56 into the motor, such leakage is free to escape by seeping past portion 50 into exhaust 46. If desired, small by-pass passages can be provided around O-rings 55 and 56 to ensure sufficient gas flow to prevent freezing in the wintertime.

Valve element 43 is biased to the neutral position shown in Fig. 5 by a pair of opposing resilient elements, such as springs 60 and 61, each having one of their ends abutting the valve member and the other end supported in a fixed position relative to housing 41.

Pilot means are provided for the selector valve which are responsive to an impulse from an external source to move the selector valve member from one position to another and to thus determine when and which inlets are in communication with the motor. Such pilot means is illustrated as a valve having a fluid connection with a pressure responsive means carried by the selector valve member for moving the latter from one position to another. Such pressure responsive means can comprise the outer ends of the selector valve member so that the latter acts as a piston when fluid pressure is exerted on its ends. The pilot valves each comprise a housing 62 including an insert 63 having a bore therethrough, the latter being enlarged at 64. Slidably mounted in this bore is a pilot valve element 65 having a reduced diameter portion 66 to provide a flow annulus 67 with the insert. Slidable seals, such as O-ring 68 and 69, are spaced on either side of the reduced diameter portion to prevent the escape of fluid along the valve member. Annulus 67 is in fluid communication with the respective ends of the selector valve member through passage 70 so that fluid can pass from the annulus to move the member.

The pilot valve element 66 is biased to a closed valve position by means of spring 71 having one of its ends seated upon insert 63 and the other pressing against a ring 72 carried by the valve element. It will be noted that the pilot valve is opened when the valve element is moved to compress the spring and thereby unseat seal 69 from insert 63. This permits the flow of fluid from inlet port 73 through passage 70. Each of ports 73 is connected by means of conduits 74 to ports 75 in the selector valve housing. It will be noted that these ports 75 are always in fluid communication with inlets 47 and 48 so that whenever pressure fluid is exerted in the inlets, it will likewise be exerted in annulus 64 of the pilot valve.

Means are provided for actuating the pilot valves from a remote point and can comprise solenoids 76 which are adapted to be energized from a central control station. Thus, when one of the solenoids is energized, it moves pilot valve element 66 to unseated position, that is, moves seal 69 from sealing engagement with insert 63, thereby permitting fluid to flow from port 73 into port 70 to exert its force against selector valve element 43 to urge it away from the particular pilot valve being actuated. When the solenoid is de-energized, spring 71 returns the pilot valve element to its seat cutting off fluid communication with the selector valve member. A leak passage 77 is provided in communication with port 70 to permit pressure fluid to leak off after the pilot valve has closed thereby allowing springs 60 and 61 to return the selector valve member to its neutral position as shown in Fig. 5.

Means are provided to stop the motor after it has turned a predetermined number of revolutions in either direction. In the illustrated embodiment, such means comprise limit valves 80 and 81 for controlling flow through the motor or through the inlets 44 and 45 to the selector valve. Each of the limit valves, as illustrated in Fig. 3, comprise a housing 82 in which valve member 83 is slidably mounted. Inlets 84 and 84a are provided for each of the limit valves to introduce fluid from an external source. This fluid passes from each limit valve to its respective inlets 47 or 48 in the selector valve as by a conduit 85. A seat 86 is provided in the housing intermediate the inlets and outlets thereto and cooperates with an enlarged diameter portion 87 of valve element 83, such portion being provided with seal rings 88 and 89, the former providing a seal with the seat to prevent the escape of fluid when the valve is closed. The lower end 90 of the enlarged diameter portion is adapted to abut against a housing plate 91 to provide a stop for the valve element. Disposed on the opposite end of the valve element is a spring 92 acting to urge the valve element toward open position. With this construction, it will be apparent that with the limit valve in the position shown in Fig. 3, flow from inlet 84 through conduit 85 is prevented but that by permitting spring 92 to move the valve element so that part 90 is in abutment with plate 89, the valve is opened and fluid will flow to the selector valve inlets.

Means are provided for opening and closing a limit valve after the motor, or the output shaft from the force transmitting means, has been turned a predetermined number of revolutions. This means is carried by a rotatable part driven by the motor so that the valve operator can be constructed as a compact unit and can have all of its working parts operatively independent of the main valve upon which it is to be mounted. Thus, referring to Figs. 2 and 3, there are provided movable elements 93 and 94 having cam surfaces 93a and 94a, respectively. It will be noted that valve members 83 of the limit valves are each provided with an actuating element in the form of stems 83a and 83b, respectively, which are adapted to be engaged by movable elements 93 or 94, respectively, when the latter are in one position to seat one of the limit valve members while the other limit valve member is permitted to move to unseated position. The cam elements are carried upon a movable part, such as rotatable shaft 95 having its ends journaled into a housing 96 for cam elements 93 and 94 and associated parts. Cooperating actuating parts are carried by the cam elements and the rotatable part providing for reciprocal movement of the cam elements responsive to rotation of the rotatable part. Such actuating parts can be mutually engaging threads on shaft 95 and on cam elements 93 and 94.

Each of cam elements 93 and 94 are provided with longitudinal slots 97 and 98, respectively, which are adapted to engage a bar 99 carried by cover plate 100. In this manner, a sliding connection is provided between the stop part formed by bar 99 and the cam elements to prevent turning of the latter relative to the limit valves. With this construction, it will be apparent that when shaft 95 is rotated, the cam elements will move back and forth along the shaft dependent upon the direction of rotation of the latter and each cam element will alternately engage and disengage stems 83a and 83b of the limit valves to alternately open and close the latter. It will also be apparent that the spacing between cam surfaces 93a and 94a and hence the number of rotations the motor can turn before one cam element permits one limit valve to open and the other cam element closes the other limit valve, can be readily and easily adjusted by merely removing cover plate 100. In so removing the plate, bar 99 is likewise removed and it is possible to rotate either one of cam elements 93 and 94 to adjust their spacing. Upon replacement of the cover plate and the bar in engagement with slots 97 and 98, the cam elements will remain in such adjusted position until a further adjustment is made.

A driving connection is provided between the motor and the rotatable part 95. As described above, shaft 14 is driven by the motor and a gear 101 is keyed to this shaft to engage a gear 102 carried by shaft 103. Shaft 103 is supported by a bearing mount 104 connected to the housing and has a gear 105 on its other end adapted to drive gear 106 on shaft 95. In this manner, shaft 95 will be driven by the motor and its directional sense of rotation will be dependent upon that of the motor.

In discussing the operation of the apparatus thus far described, let it be assumed that the cam elements are positioned as shown in Fig. 2 so that limit valve 80 is open and limit valve 81 closed. Since a pressure fluid is supplied to inlets 84 and 84a of the limit valves, such pressure fluid will be transmitted to inlet 47 of the selector valve whereas inlet 48 will not have the fluid supplied thereto. With the selector valve in neutral position as shown in Fig. 5, the pressure fluid is also exerted through conduit 75 into annulus 65 of the right-hand pilot valve. By energizing the right-hand solenoid, the right pilot valve member is moved to open position thereby admitting pressure fluid against the right end of selector valve member 43. The resulting movement to the left of the selector valve member places inlet 47 in communication with port 44 and port 45 in communication with exhaust port 46. Fluid then flows through the motor to rotate it. The rotation of the motor also turns shaft 95 which moves both of cam elements 93 and 94 to the left as viewed in Fig. 2. Upon such movement, limit valve 81 is opened and, after a predetermined number of revolutions of the motor, limit valve 80 will be closed thus cutting off flow of gas to the motor. Upon closing of limit valve 80, gas to the right-hand pilot valve is also cut off and de-energization of the solenoid permits its pilot valve member to return to seated position. Upon seating, gas leaks through passage 77 permitting the selector valve member to return to neutral position under the influence of springs 60 and 61. The valve operator will then remain dormant until the left-hand pilot valve is actuated to reverse the operations discussed above. It will be noted that after the above operations have occurred, energization of the right-hand solenoid will not result in any movement of the valve operator inasmuch as limit valve 80 is closed.

It will be apparent from the foregoing that the spacing between cam elements 92 and 93 is determinative of the number of revolutions output shaft 14, or motor 19, can make after energization of a solenoid and before the corresponding limit valve is closed. Such number is easily adjustable by changing the spacing apart of cam members 93 or 94 as discussed above. Also, it is possible to individually move one of cam elements 93 or 94 in order to stop the valve operator after the main valve has been seated with the desired force or after it has been moved to a desired open position.

Referring now to the selector valve illustrated in Fig. 7, it is noted that it is designed to always maintain a passage open to the motor so that upon supply of fluid to such passage, the motor will be rotated to operate the main valve. Reversal of the motor to operate the valve in an opposite direction is by manual control.

Figure 8:
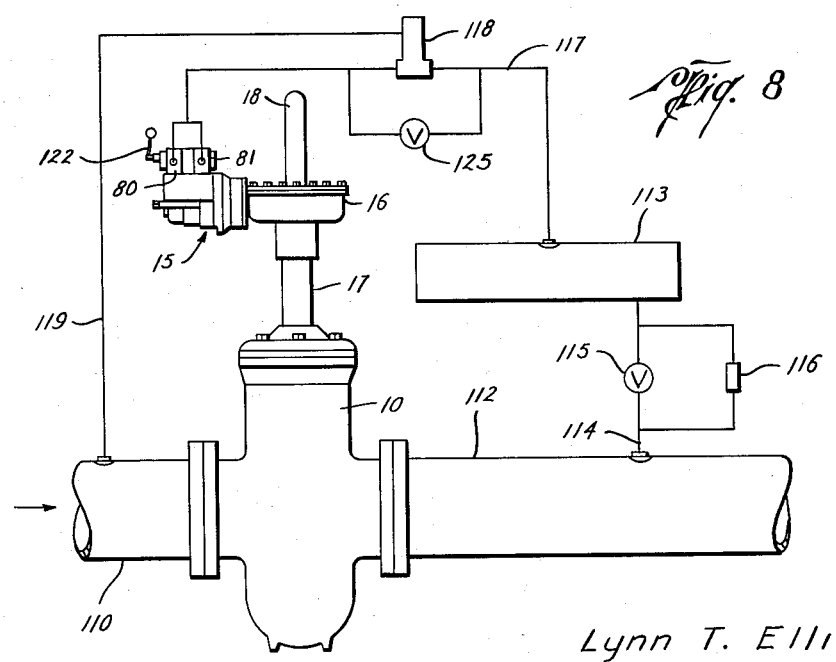
Fig. 8 illustrates a control system in which the selector valve of Fig. 7 has been found to be useful.
Figure 4:
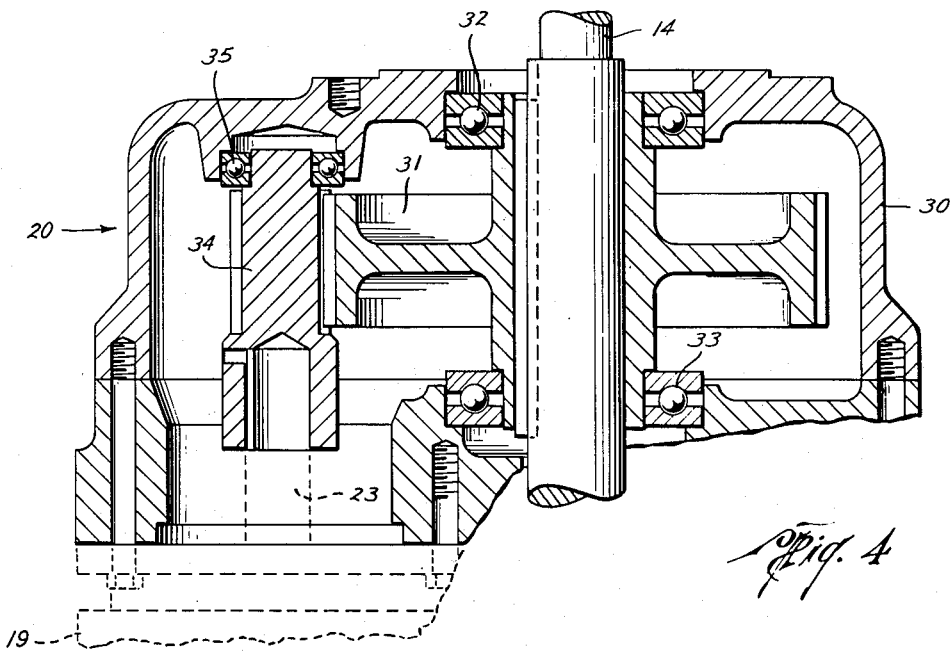
Fig. 4 is a view taken on the line 4—4 of Fig. 2.

Referring to the system shown in Fig. 8 in which the selector valve of Fig. 7 is particularly adapted for use, there is illustrated a valve 10 having a valve operator 15 mounted thereon of the same construction as illustrated in Figs. 2 and 3 except for the substitution of the selector valve of Fig. 7 for the selector valve of Fig. 5. The valve is situated in a pipe line comprising an upstream conduit 110 and a downstream conduit 112. A reservoir 113 is provided and is connected to the pipe line by means of a conduit 114 in which is situated a check valve 115 permitting flow into but preventing flow from the reservoir. By-passed around the check valve is an orifice 116 whose purpose will be hereinafter explained. Pressure gas from reservoir 113 is supplied to both of limit valves 80 and 81 via a conduit 117. Disposed in this conduit is a differential valve 118 adapted to remain closed and prevent flow through conduit 117 as long as the pressure differential between the pipe line and reservoir 113 is less than a predetermined value. As soon as the pressure differential exceeds this value, as, for example, when a break occurs in the pipe line permitting its pressure to drop below that of reservoir 113, differential valve 118 opens permitting gas to flow to the valve operator. The pressures to which the valve is sensitive are supplied through conduit 117 and conduit 119. This valve is of a type well known to those skilled in the art and a detailed description is not warranted for that reason.

Referring now to the selector valve of Fig. 7, it will be seen that its construction is substantially that of the selector valve of Fig. 5 except spring 120 has been substituted for spring 61 and the left-hand pilot valve of Fig. 5. Spring 120 biases the selector valve member to one position such that the motor is always in communication with the limit valve which is open when the main valve is open. Thus, as illustrated, inlet 48 is always in communication with port 45 except when the manual operating means is being actuated. Port 44, on the other hand, is always in communication, under such circumstances, with exhaust port 46.

A manual means for moving the selector valve member is provided and is substituted for spring 60 and the right-hand pilot shown in Fig. 5. Such manual means can comprise an extension 121 of the selector valve member to which is pivoted a lever 122 which terminates in a handle 123. Lever 122 is pivoted to the selector valve body by link pin 124 so that movement of handle 123 to the right will move selector valve member 43 to the left. Upon release of handle 123, spring 120 moves the selector valve member to the right.

With such a selector valve installed on the valve operator and in the system of Fig. 8, and with valve 10 in open position, operating gas will not be supplied to the valve operator as long as the differential between the pipe line and reservoir 113 is less than a predetermined value. However, upon exceeding this predetermined pressure differential, valve 118 will open permitting gas to flow from reservoir 113 into inlet 48 and thence through port 45 to the motor. This causes the motor to turn and close valve 10. Thus, if a break occurs in the pipe line, the resulting drop in pressure therein automatically closes valve 10. To open the valve, by-pass valve 125 is opened and handle 123 is moved to place inlet 47 in communication with port 44 and to place port 45 in communication with exhaust port 46. As long as the handle is held in this position, the operator will function to open the valve. After the valve has been opened, release of the handle will automatically return the selector valve member to the position shown in Fig 7.

As stated above, orifice 116 is provided as a by-pass around check valve 115. The orifice permits gradual fluctuations of pipe line pressure normally occurring due to variations in operating conditions to be reflected in reservoir 113 thereby preventing differential valve 118 from opening and starting the valve operator due to a normal operating pressure variation in the pipe line. However, a sudden change in pressure in the pipe line, as when a break occurs, will cause the pressure in the pipe line to rapidly drop and orifice 116 is sufficiently small that the pressure in reservoir 113 does not drop as rapidly as in the pipe line thereby creating the required differential to open valve 118. Thus, orifice 116 is sufficiently large as to permit fluid flow into and out of reservoir 113 under the influence of normal operating pressure fluctuations in the pipe line but is small enough that upon a drop of pipe line pressure in excess of a predetermined rate, the pressure differential between the reservoir and pipe line will exceed that required to open valve 118. Of course, the reservoir is sufficiently large that, with a pipe line break, it contains enough gas at a high enough pressure to operate the valve operator and close the main valve.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus which comprises, in combination, a main valve including a valve stem to be moved to open and close the main valve; a unitary valve operator assembly mounted on said main valve and including a reversible rotary fluid motor, power transmitting means connected to the motor and including an output shaft, selector valve means connected to the motor and actuatable to reverse the direction of fluid flow through the motor, a limit valve in series with said selector valve means and controlling flow through the motor, a rotatable part carried by the assembly, drive means connecting said rotatable part to one of said motor and power transmitting means at a point within the assembly and independently of any mechanism for connecting said output shaft to said stem, a cam element carried by the assembly and adapted upon movement to engage said limit valve to close the latter, cooperating actuating parts connecting between the cam element and rotatable part providing for such movement of the cam element responsive to rotation of the rotatable part and causing said cam element to engage said limit valve to close the same after said motor has rotated a predetermined number of revolutions in one direction, and flow conducting means connected to said selector valve means in parallel with said limit valve for by-passing fluid around the limit valve to rotate the motor in a direction opposite to said one direction while the limit valve is closed; and means connecting the output shaft to said stem to move the latter to open and close said main valve responsive to actuation of said motor.

2. An apparatus which comprises, in combination, a main valve including a valve stem to be moved to open and close the main valve; a valve operator assembly including a rotary fluid motor, power transmitting and speed reducing means connected to the motor and including an output shaft, means connecting said output shaft to said stem to move the latter to open and close said main valve responsive to actuation of said motor, a limit valve controlling flow through the motor and having an actuating part movable to open and close the limit valve, a cam element mounted on a rotatable part for rotation relative thereto, a driving connection connecting said rotatable part to one of said motor and power transmitting and speed reducing means independently of said means connecting said output shaft to said stem, mutually engaging threads on said cam element and said rotatable part providing reciprocal movement of the cam element responsive to rotation of the rotatable part to move said actuating part to open and close said limit valve, and removable means preventing said cam element from rotating relative to said actuating part of said limit valve.

3. In a valve operator, a reversible rotary motor, said motor having a plurality of ports alternately adapted to admit gas under pressure as a motive fluid for said motor, reversible power transmitting means connected to the motor and adapted to be connected to a valve for operating the same, a limit valve to cut-off flow of gas through the motor, a rotatable part driven by the motor, and means movable by the rotatable part for closing said limit valve after said motor has turned a predetermined number of revolutions.

4. The operator of claim 3 wherein said motor is of the vane type.

5. In a valve operator, a rotary fluid motor, power transmitting means connected to the motor and adapted to be connected to a valve for operating the same, a limit valve controlling flow through the motor, a rotatable part driven by the motor, means movable by the rotatable part for closing said limit valve after said motor has turned a predetermined number of revolutions in one direction, means for opening said limit valve responsive to turning of the motor in another direction, and means for stopping the motor after it has turned to a predetermined extent in said other direction.

6. In a valve operator: an assembly including a rotatable fluid motor having fluid ports through which fluid can be passed in one direction to rotate the motor in one rotational sense and in another direction to rotate the motor in an opposite rotational sense, power transmitting means connected to the motor and adapted to be connected to a valve for operating the same, a selector valve having fluid inlet ports for admission thereto of fluid from an external source and having other ports connected to the fluid ports of said motor so that fluid flow can be switched from one of said motor's ports to another to control the direction of rotation of the motor, limit valves controlling flow of said fluid through said motor and including actuating parts movable to close said valves; cam elements carried by said assembly, a rotatable part carried by the assembly, drive means connecting said rotatable part to one of said motor and power transmitting means at a point within the assembly and independently of any mechanism to which said power transmitting means may be connected, cooperating actuating parts carried by the cam elements and the rotatable part providing for reciprocal movement of the cam elements responsive to rotation of the rotatable part to engage a cam element with an actuating part of one of said limit valves to close said one limit valve after said motor has rotated a predetermined number of revolutions in one direction and to engage the other cam element with the actuating part of the other limit valve to close the other limit valve after the motor has rotated a predetermined number of revolutions in the other direction.

7. In a valve operator: a power assembly including a rotatable fluid motor reversible in its direction of rotation by reversal of the fluid flow therethrough, power transmitting and speed reducing means connected to the motor and adapted to be connected to a gear assembly mounted on a main valve for movement of a valve stem to open and close the main valve; a selector valve controlling flow of fluid through the motor and having a valve element positionable in a first position to pass fluid through said motor in one direction and positionable in a neutral position to prevent flow to said motor; a limit valve controlling flow of fluid through said motor and through the selector valve when the latter is in said first position; a cam element carried by said power assembly, a rotatable part also carried by said power assembly, drive means connecting said rotatable part to one of said motor and power transmitting and speed reducing means at a point in said power assembly and independently of any main valve gear assembly to which said power transmitting and speed reducing means may be connected, cooperating actuating parts carried by the cam element and a rotatable part providing for reciprocal movement of the cam element responsive to rotation of the rotatable part to close said limit valve while said selector valve element is in said first position and after said motor has turned a predetermined number of revolutions.

8. The operator of claim 7 wherein said selector valve element is also positionable in a second position to pass fluid through the motor in a direction opposite to the direction of flow when the selector valve element is in said first position, and wherein there is provided means for stopping the motor after it has turned a predetermined number of revolutions in a direction opposite to that which it turns when the selector valve element is in said first position.

9. In a valve operator, a rotatable fluid motor having fluid ports through which fluid can be passed in one direction to rotate the motor in one rotational sense and in an opposite direction to rotate the motor in an opposite rotational sense, power transmitting means connected to the motor and adapted to be connected to a valve for operating the same, a selector valve controlling flow of fluid through the motor and having two fluid inlets for admitting fluid thereto from an external source, said valve also having ports connected to the ports of said motor and a valve element movable to a first position to establish flow from one inlet through one valve port to the motor to rotate it in one direction while flow from the other inlet is blocked, said valve element also being movable to a second position to establish flow from said other inlet through a second valve port to the motor to rotate it in a direction opposite that of said one direction while flow from said one inlet is blocked, limit valves controlling flow through said inlets, cam elements mounted on a rotatable part driven by the motor, cooperating actuating parts carried by the cam element and a rotatable part providing for reciprocal movement of the cam elements responsive to rotation of the rotatable part to close one limit valve while said selector valve element is in said first position and after said motor has turned a predetermined number of revolutions in one direction and to close said other limit valve while said selector valve element is in said second position and after said motor has turned a predetermined number of revolutions in an opposite direction.

10. The operator of claim 9 wherein said rotatable part is a rotatable shaft having a driving connection with the motor and said cam elements are threaded to the shaft, and wherein there is provided a stop part having a sliding connection with the cam elements to prevent their turning relative to the limit valves.

11. The operator of claim 10 wherein said stop part is a bar extending in the direction of reciprocal movement of the cam elements and said cam elements are slotted to receive said bar to provide said sliding connection.

12. The operator of claim 11 wherein said bar is carried by a plate so that upon removal of the plate, the cam elements can be screwed back and forth on said rotatable shaft with respect to each other to adjust the number of revolutions said motor can turn before said limit valves are respectively closed.

13. The operator of claim 9 in combination with a pilot means responsive to an impulse from an external source to move said selector valve element from one position to another.

14. The operator of claim 13 wherein said selector valve element includes a pressure responsive means for moving the valve element from one position to another and wherein said pilot means is a valve having a fluid connection with said pressure responsive means to admit pressure fluid thereto upon being actuated.

15. In a valve operator, a reversible rotary fluid motor, a selector valve controlling the direction of gaseous flow through said motor, means for connecting the motor to a source of gas at an elevated pressure, a limit valve controlling gas flow through said motor and having a valve member connected to an actuating element for movement of the valve member to seated position responsive to movement of the actuating element, a driven element movable to move said actuating element to close said valve, a rotatable part driven by said motor, and actuating parts between said rotatable part and said driven element to move the latter to seat said valve member upon predetermined rotation of the motor in one direction and to permit the valve member to move to unseated position upon rotation of the motor in an opposite direction, said selector valve having a valve member movable to a first position to permit flow of gas through said limit valve and said motor and to a second position to block flow through said limit valve and said motor.

References Cited in the file of this patent

UNITED STATES PATENTS

| | | |
|---|---|---|
| 387,907 | Pendleton | Aug. 14, 1888 |
| 813,815 | McIntosh | Feb. 27, 1906 |
| 965,270 | Zelle | July 26, 1910 |
| 981,271 | Hutchins | Jan. 10, 1911 |
| 1,224,008 | Nelson | Apr. 24, 1917 |
| 1,835,686 | Allan et al. | Dec. 8, 1931 |
| 1,891,545 | Kindervater | Dec. 20, 1932 |
| 2,063,414 | Tweddell | Dec. 8, 1936 |
| 2,258,585 | Hedene | Oct. 14, 1941 |
| 2,393,223 | Rosen | Jan. 15, 1946 |
| 2,616,448 | Werey | Nov. 4, 1952 |

FOREIGN PATENTS

| | | |
|---|---|---|
| 451,531 | Great Britain | Aug. 7, 1936 |